United States Patent [19]

Bunick et al.

[11] Patent Number: 5,091,015

[45] Date of Patent: Feb. 25, 1992

[54] POLYDEXTROSE COMPOSITIONS

[75] Inventors: Frank J. Bunick, Randolph; Shiuh J. Luo, Livingston, both of N.J.

[73] Assignee: Warner-Lambert Company, Morris Plains, N.J.

[21] Appl. No.: 527,224

[22] Filed: May 22, 1990

[51] Int. Cl.[5] .............................................. C13J 01/06
[52] U.S. Cl. ...................................... 127/30; 127/46.2
[58] Field of Search ................................ 127/46.2, 30

[56] References Cited

U.S. PATENT DOCUMENTS

| 2,578,937 | 12/1951 | Kunin et al. | 127/146.2 |
|---|---|---|---|
| 2,606,847 | 8/1952 | Newkirk et al. | 127/146.2 |
| 2,876,104 | 3/1959 | Blindzius et al. | 99/141 |
| 2,876,105 | 3/1959 | Jucaitis et al. | 99/141 |
| 2,876,106 | 3/1959 | Jucaitis et al. | 99/141 |
| 2,876,107 | 3/1959 | Jucaitis et al. | 99/141 |
| 3,130,082 | 4/1964 | Serbia | 127/146.2 |
| 3,766,165 | 10/1973 | Rennhard et al. | 260/209 |
| 3,868,465 | 2/1975 | Fruda et al. | 426/168 |
| 3,874,924 | 3/1975 | Sands et al. | 127/129 |
| 3,971,857 | 7/1976 | Fruda et al. | 426/548 |
| 4,024,290 | 5/1977 | Layton | 426/548 |
| 4,042,714 | 8/1977 | Torres | 426/62 |
| 4,351,672 | 9/1982 | Hohnerlein et al. | 127/46.3 |
| 4,382,963 | 5/1983 | Klose et al. | 426/3 |
| 4,528,206 | 7/1985 | Kastin | 426/660 |
| 4,587,953 | 5/1986 | Rosene | 127/46.2 |
| 4,597,981 | 7/1986 | Kastin . | |
| 4,746,368 | 5/1988 | Frank et al. | 127/46.2 |

FOREIGN PATENT DOCUMENTS 892701A 7/1982 Belgium .
0380248 8/1990 European Pat. Off. .
1254148 5/1985 Japan .

OTHER PUBLICATIONS

Grant's Chemical Dictionary, 5th ed., Grant, 1987, pp. 179, 263, 550, 552.
"The Functional Applications of Polydextrose", Pfizer, Inc. (Smiles).
"Polydextrose Research Product Bulletin".

Primary Examiner—Aaron Weisstuch
Assistant Examiner—Patricia L. Hailey
Attorney, Agent, or Firm—Craig M. Bell

[57] ABSTRACT

A polydextrose composition that is substantially free of bitter tasting and color causing compounds is useful as a bulking agent in the incorporation of low calorie foods. In particular, the bulking agent may be combined with high intensity sweeteners as a replacement for sugar in foods so as to lower their calories without detracting from their texture and mouthfeel. Commercially available polydextrose that otherwise contains acidic compounds that cause bitter tastes and contribute to off colors thereby deterring its use in many food applications is purified through modified ion exchange column chromatography.

27 Claims, 2 Drawing Sheets

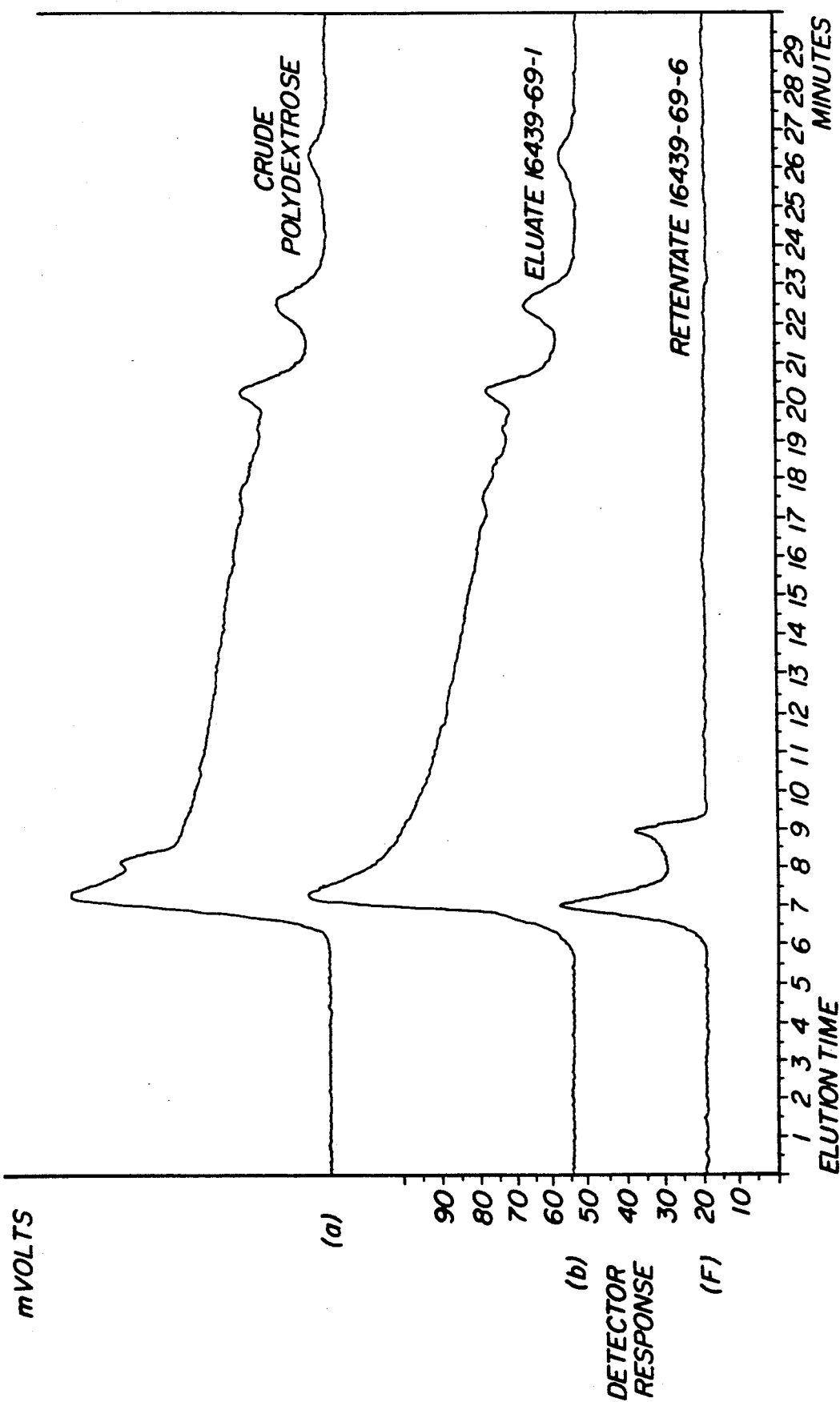

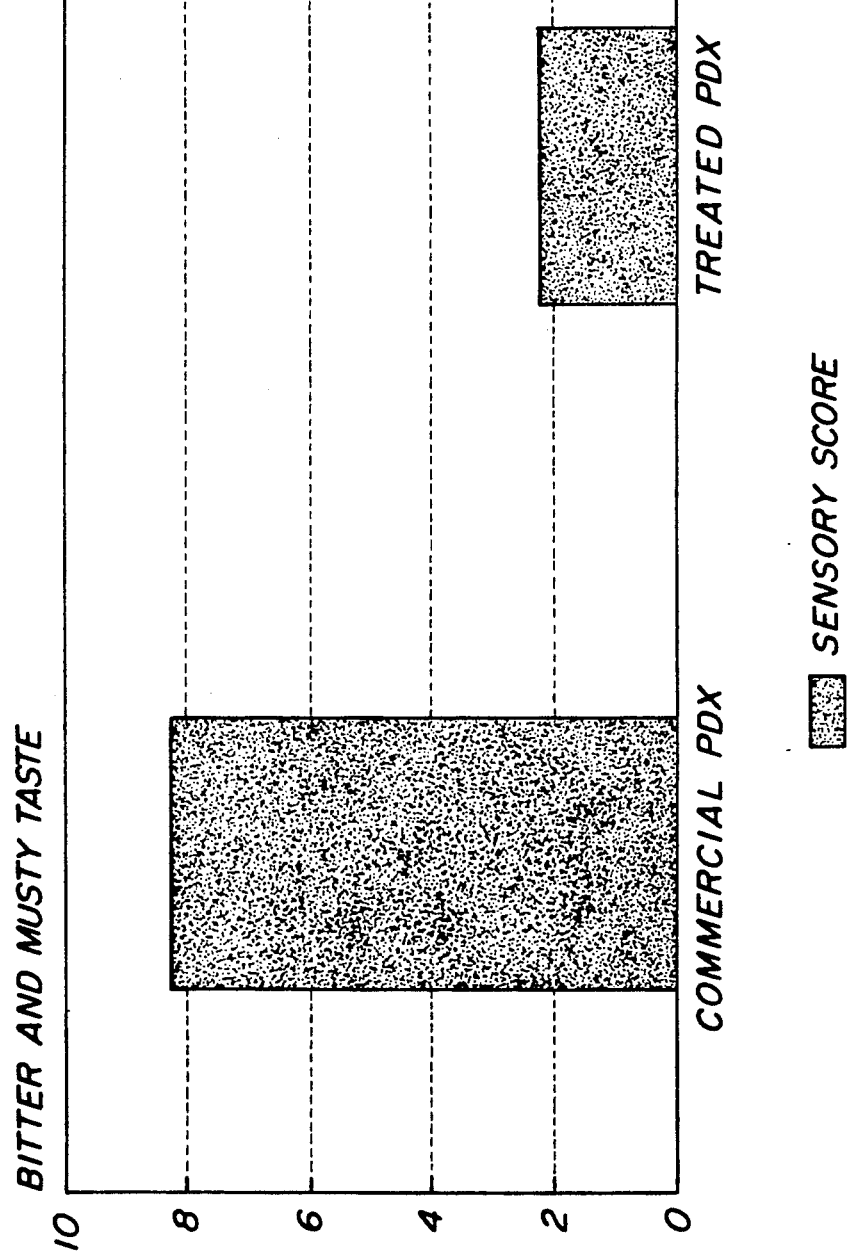

POLYDEXTROSE COMPOSITIONS

FIELD OF THE INVENTION

This invention relates to the purification of polydextrose using an ion exchange column that produces a product that is substantially free of flavor compounds which detract from its taste and visual aesthetics and consequently detract from its use as a bulking agent in foodstuffs. More particularly, the present invention provides a purified polydextrose that is decolorized with a superior flavor quality through the removal of bitter compounds.

BACKGROUND OF THE INVENTION

Polydextrose is a water-soluble, low calorie non-cariogenic bulking agent. It is a randomly cross-linked glucan polymer produced through the acid-catalyzed condensation of glucose. U.S. Pat. Nos. 3,766,165 and 3,876,794 to Rennhard detail the preparation of polymeric glucose and maltose products by anhydrous melt polymerization using non-volatile, edible organic polycarboxylic acids such as citric acid as catalysts, cross-linking agents or polymerization activators.

Polydextrose is an essentially non-nutritive carbohydrate (approximately 1 calorie/gram) substitute. It provides a substitute for sugar and has many of the desired technological properties of sugar, but does not have the sweetness. This non-sweet bulking capability is advantageous where conventional sugar-based compositions have proven to be too sweet. Moreover, this non-sweet bulking capability is especially advantageous when used in combination with high intensity sweeteners to provide low-calorie food products having the desirable texture of conventional sugar-containing food products without the calories associated with the sugar.

Polydextrose is commercially available in three forms, Polydextrose A, an amorphous, slightly acid fusible powder, Polydextrose N, a neutralized, light-colored 70% solution of Polydextrose A, and Polydextrose K, a neutralized powder form of Polydextrose A. These are produced by the Pfizer Co., New York, N.Y. As the polymerization process produces a mixture of polysaccharides and saccharide residuals, none of these products is a pure polydextrose product. All of these polydextrose products include a variety of residual compounds, such as glucose, sorbitol, citric acid and other compounds which contribute to the taste, color and caloric value of these products. In addition, all of the polydextrose products also include other low molecular weight compounds such as 1,6-anhydroglucose (levoglucosan) and 5-hydroxymethylfur-fural and a series of furaldehyde derivatives which also contribute a bitter taste and musty off-flavor. Although these low molecular weight compounds are found in polydextrose products only in small amounts (1,6-anhydroglucose, about 4%, bitter taste) (5-hydroxmethylfurfural, about 0.1 PPM, musty off-flavor), those amounts are significant enough to negatively impact on the usefulness of polydextrose in most food products when polydextrose is present in medium to high levels.

U.S. Pat. No. 4,622,233 to Torres discloses a first method of treating polydextrose by decolorizing with a bleaching agent and thereafter purifying the decolorized material. A further method disclosed and claimed in the Torres '233 disclosure for reducing color, glucose content and anhydroglucose content of Type A polydextrose includes the following steps: (a) contacting a 60–70% (W/W) aqueous solution of polydextrose Type A with a food-approved bleaching agent at a temperature of 25°–90° C. and a pH of about 2.5 to about 9.0; (b) adjusting the pH of the product of step (a), if about 7.0, to about 6.0; (c) adding one or more of the solvents selected from the group consisting of methanol, ethanol and ethylacetate such that said solvent includes 50–80% (W/W) of the mixture; and (d) filtering the final product, and, if desired, drying. The Torres '233 patent however, relates decoloration to purification which is not necessary. Moreover, decoloration in this manner can be an undesired process requirement and condition which produces its own additional problems. For example, when the polydextrose purified by the Torres '233 method is subjected to high heating, such as in cooking, the coloring returns to the substance. In addition, the bleaching step leaves undesirable residual chemicals which are difficult to remove. Furthermore, extra steps are required by Torres which require additional time, handling, and energy.

U.S. Pat. application Ser. No. 043,793, filed Apr. 29, 1987, entitled "Method of Purifying Polydextrose and Composition Containing Same" and assigned to Warner-Lambert Company, assignee of the present application, discloses a process for providing a purified, unbleached polydextrose product wherein an aqueous solution of polydextrose in a concentration of from about 10% to about 90% is intimately contacted with a polar organic solvent such as ethanol or acetone. The ratio of polydextrose to solvent is from about 5% to about 45% by weight of polydextrose to about 35% to about 85% by weight of solvent. The mixture is then allowed to equilibrate to form a substantially contaminant-containing fraction and a substantially polydextrose-containing fraction. The fractions are then separated for use of the polydextrose-containing fraction.

Co-pending U.S. Pat. application Ser. No. 193,961 filed on May 13, 1988 entitled "Purification of Polydextrose by Reverse Osmosis" also assigned to the Warner-Lambert Company discloses a process and purified polydextrose composition produced thereby wherein low molecular weight compounds such as 1,6-anhydroglucose and numerous furaldehyde derivatives are removed by modified reverse osmosis techniques. These small molecular weight compounds contribute to the musty, acidic off-tastes prevalent in the commercially available product and their removal results in a superior product with a cleaner taste.

None of the above processes or products successfully removed all of the residual contaminants that remain from the manufacturing process, however. It is an object of the present invention to produce a polydextrose composition for use in foodstuffs that is substantially free of the bitter, musty off-tastes associated with the commercially available product. It is a further object of the present invention, so produce a polydextrose composition that is decolorized through the removal of these contaminants to produce a more visually aesthetic product. More specifically, it is the object of the present invention to purify polydextrose through the use of ion-exchange which surprisingly removed most of the bitter and musty off-tastes which appear to be associated with compounds that bind to the ion exchange resins. It was found that these compounds are intimately associated with the polydextrose polymer to the extent that they have been heretofore unknown. Their removal not only results in a superior polydextrose composition with a cleaner, non-bitter taste but at the same time decolorizes the composition thereby enhancing its aesthetic value in its use in various food products.

SUMMARY OF THE INVENTION

A superior polydextrose bulking agent composition is produced through the purification of the commercially available product using a modified ion exchange resin column. The process removes heretofore unknown compounds which are intimately associated with the polydextrose polymer that give the composition a bitter taste and off colors that greatly detract from its application as a bulking agent. More specifically, a polydextrose solution is passed through an anionic, cationic or mixed bed resin column that removes charged compounds intimately associated with the polydextrose polymer. The ion exchange column purification also permits for greater yields and faster processing than ever before possible.

BRIEF DESCRIPTION OF THE DRAWINGS

FIG. 1a is a high pressure liquid chromatography (HPLC) chromatogram of a polydextrose sample prior to ion exchange purification.

FIG. 1b is an HPLC chromatogram of a polydextrose sample after treatment with an ion exchange resin.

FIG. 1F is an HPLC chromatogram of the retentate washed from the ion exchange resin.

FIG. 2 is a graph depicting sensory scores on a scale of 1 (low) to 10 (high) comparing the taste quality of commercial untreated polydextrose compositions with those of the present invention.

DETAILED DESCRIPTION OF THE INVENTION

Compounds that were surprisingly discovered as being responsible for the majority of the bitter off-tastes and brownish-yellow taint associated with commercially available polydextrose are believed to be produced during the glucose polymerization process. Generally, polydextrose is produced as a long-chain glucose polymer through an acid catalyzed reaction using citric acid as the catalyst. Whereas citric acid is a tri-carboxyllic acid, without being held to any definite theory it is believed that during the condensation process a carboxyllic functional group of citric acid ($COO^-$) forms a covalent ester bond with a hydroxyl group ($OH^-$) of the glucose molecule, thereby becoming intimately bound. Not only does the polydextrose develop its bitter taste in this manner but during the condensation process the sugar solution is heated which typically results in carmelization of the glucose or sugar which produces a brown tint in the polydextrose as well as a large number of flavor compounds.

Classic ion exchange separation is well known in the art but has not been used in the purification of synthetic bulking agents such as polydextrose. Ion exchange resins are generally of two types. Anion exchange resins are organic molecules that generally contain three amine ($NH_3^+$) or other basic type groups. At a particular pH, these become positively charged (+) and will bind to negatively charged (−) groups such as organic acids. During elution, the acidic compounds are held to the resin as the now purified solution containing the desired compounds in question passes through the column. These exchange resins are generally quaternary ammonium groups attached to a styrene and divinylbenzene copolymer. $[\phi-CH_2N(CH_3)_3]^+Cl^-$. Commonly known anionic resins are Amberlite IR-45 (Rohm & Haas Co., Phila., Penna.,) Dowex 1, (Dow Chemical Co., Midland, Mich.); Duolite, (Diamond Alkali Co., Redwood City, Calif.), Ionac A-450, (Ionac Chemical Co., New York, N.Y.). These are generally comprised of acidic resins composed of derivatives of cellulose, chitin, polyacrylamide gel, dextrans, silicate and vinyl cross-linked resins.

Cationic exchange resins are also organic compositions that generally contain three acid groups such as sulphuric ($SO_3-$), phosphoric ($PO_3-$) or carboxyllic ($COO-$) as functional binding sites that are attached to an acrylic or styrene and divinyl benzene copolymer. These become negatively charged above a particular pH and bind to positively charged (+) molecules, thereby removing them from the solution which passes through the column with the purified product of interest. Ion exchange columns may also be used to bind a desired compound or molecule thereby taking it out of its solution which passes through the column. The resin and the attached compound of interest is then eluted or washed with an acid or base solution depending on the resin used. This removes the bound fraction from the resin which may then be isolated and dried. Suitable cation exchange resins include Amberlite IR-120, Dowex 50W, Duolite C-20 etc. These are commercially available from the same sources previously disclosed and are generally basic resins comprised of the same derivatives as those materials listed as anionic exchange resins.

A third type of ion exchange column useful in the practice of the present invention uses a mixed bed resin comprised of both anionic (+) and cationic (−) resins. Using this type of ion exchange column, it was surprisingly disclosed that polydextrose could not only be deflavored of the bitter, acid taste but partially decolorized as well. Useful resin materials include silicate, chitin, and cellulose derivatives such as AE-cellulose, DEAE-cellulose, TEAE-cellulose and G. E. cellulose manufactured and sold by W. & R. Balston Ltd., Maidstone, Kent, England. Other suitable resin materials include acrylic or styrene and divinyl benzene copolymer.

A particular ion exchange resin useful in the practice of the present invention is the Whatman brand preswollen microgranular diethylaminoethyl cellulose resin DE52 also made by W. & R. Balston.

Typically, acidic contaminants carry a negative charge at a pH value above 3.0 and can be removed from solution using a positively charged anion exchange resin. Preferably, the polydextrose solution to be purified is adjusted to a pH value of approximately 4.0 or greater using an alkali such as sodium hydroxide (NaOH), potassium hydroxide (KOH), sodium carbonate ($Na_2CO_3$), bicarbonate, ($NaHCO_3$) etc.

The polydextrose used in the practice of the present invention can be any one of the three aforementioned types. In one embodiment of the present invention, the pH adjusted polydextrose is mixed with an anion exchange resin in a dry weight ratio of about 0.1 to 100 depending on the total capacity and amount of the anion exchange resin used. The concentration of polydextrose may range from about 10% to about 90%; or preferably from about 20% to about 60%; or most preferably from about 30% to about 40%. The mixing of polydextrose and resin can be performed in a batch process or by a continuous column process, and heat or pressure can be applied to accelerate the process. The pH of the mixture should be 4.0 or greater to insure complete ionization of acid groups but must also be compatible with the ion exchange resin. The pH can be maintained by buffer systems. Useful buffers include phosphate, acetate, and alike.

The polydextrose composition in solution may be eluted one or more times and repeated elutions will increase the purity of the final product. The polydextrose solution is then concentrated by any one of a number of drying procedures such as spray drying, evaporation, etc., known in the art until a commercially useful product is obtained. By commercially useful, the polydextrose may be either a dry solid or a high solids, viscous solution, whatever fulfills the needs of the particular application.

The following examples are provided to better define the inventive features of the polydextrose composition and its purification process. Whereas it is acknowledged that minor changes can be made in the processing parameters or materials used therein, these examples should be regarded as illustrative only and are not to be construed as limiting the spirit and scope of the claims that follow.

EXAMPLE 1

A polydextrose solution (5% w/w in deionized water) of 1000 ml. was added to 500 gm. diethylaminoethyl cellulose resin (pre-swollen microgranule Whatman DE52 anion exchanger). The slurry was adjusted to pH 6.0 and stirred, and subsequently filtered through Whatman #1 filter paper with the aid of a vacuum. The eluate was coded as "A". A volume of deionized water (1000 ml.) was used to wash the resin, the mixture was filtered again, and the second eluate was coded as "B". The procedure of washing and filtering was repeated three more times, and the eluates were coded as C, D and E, respectively. The final wash used 500 ml. of a 0.12 N HCl solution to strip the resin of any adsorbed acidic oligomers. This eluate was collected and filtered as before and was coded as rententate "F". FIG. 1 shows the high pressure liquid chromatography chromatograms of the untreated polydextrose (la), eluate A (1b) and rententate F (1F).

As the chromatogram clearly demonstrates, the untreated polydextrose produces a main peak at six (6) minutes and contains a minor second peak that would indicate the presence of citric acid. The additional minor peaks at nineteen (19), twenty-two (22), and twenty-seven (27) minutes are due to the presence of low molecular weight contaminants such as 1,6 anhydroglucose, sorbitol ad glucose Furaldehyde derivatives can be detected by gas chromatography after biphasic extraction with the appropriate organic solvent. The chromatogram of eluate A on the other hand, revealed a main peak produced by the polydextrose polymer. However, the minor second peak which was a part of the untreated sample and was attributable to the citric acid and other acidic compounds is missing. These however, show up at six (6) and eight (8) minutes in the chromatogram of rententate F (FIG. 1F) indicating the presence of the acidic compounds and citric acid. The first and second peak of the chromotogram of retentate F contribute about 1% and 0.75% of the total crude polydextrose weight, respectively. The first peak is a believed to be a mixture of acidic polydextrose polymers and the second peak is citric acid. No peaks were observed in Eluates B, C, D, and E indicating that the washed resin was free of residual non-acidic polydextrose (data not shown). Eluate A is the debittered polydextrose having little or no bound acidic compounds, oligomers or free citric acid. Once concentrated, this fraction was made into hard candy and evaluated for taste by sensory personnel. FIG. 2 clearly shows the intrinsic bitterness of the commercial polydextrose was greatly reduced.

What we claim is:

1. A polydextrose composition, substantially free of color and bitter-tasting residual compounds made by the process consisting essentially of:
   a. dissolving polydextrose in a solvent;
   b. adjusting the pH of the polydextrose solution thus formed to approximately 3.0 or higher;
   c. passing said solution through an ion exchange column; and
   d. collecting and concentrating the eluate produced thereby until a commercially useful polydextrose composition is recovered.

2. The polydextrose composition of claim 1 wherein said solvent is water.

3. The polydextrose composition of claim 2 wherein the concentration of polydextrose in solution ranges from approximately 10% to about 90%.

4. The polydextrose composition of claim 3 wherein the concentration of polydextrose in solution ranges from about 30% to about 40%.

5. The polydextrose composition of claim 3 wherein said ion exchange column consists of an anion exchange resin.

6. The polydextrose composition of claim 3 wherein said ion exchange column consists of a cationic exchange resin.

7. The polydextrose composition of claim 3 wherein said ion exchange column consists of a mixed bed resin.

8. The polydextrose composition of claim 5 wherein said anionic exchange resin is selected from the group of acidic resins consisting of cellulose derivatives, chitin and its derivatives, silicates, dextrans, polyacrylamide gel, styrene and divinyl benzene copolymers and mixtures thereof.

9. The polydextrose composition of claim 6 wherein said cationic exchange resin is selected from the group of basic resins consisting of cellulose derivatives, chitin and its derivatives, silicates, dextrans, polyacrylamide gel, styrene and divinyl benzene copolymers and mixtures thereof.

10. The polydextrose composition of claim 7 wherein said mixed bed exchange resin is selected from the group consisting of a mixture of basic and acidic resins consisting of cellulose derivatives, polyacrylamide gel, styrene and divinyl benzene copolymers, dextrans, chitin and its derivatives, and silicates.

11. The polydextrose composition of claims 5, 6, or 7 wherein said polydextrose solution is passed through said ion exchange column at room temperature.

12. The polydextrose composition of claim 1 wherein said polydextrose solution is passed through said ion exchange column more than once.

13. A polydextrose bulking agent, useful for the incorporation in reduced calorie foods, substantially free of bitter-tasting compounds.

14. The polydextrose bulking agent of claim 13 substantially free of color causing compounds.

15. The polydextrose composition of claim 13 or 14 wherein said color-causing and bitter tasting compounds are acidic.

16. A method for the purification of polydextrose consisting essentially of:
   a. dissolving polydextrose in a solvent;
   b. adjusting the pH of the polydextrose solution to approximately 3.0 or higher;
   c. passing said solution through an ion exchange column.
   d. collecting and concentrating the eluate produced thereby until a substantially functional product is recovered.

17. The method of claim 16 wherein said solvent is water.

18. The method of claim 17 wherein the concentration of polydextrose in solution ranges from approximately 10% to about 90%.

19. The method of claim 18 wherein the concentration of polydextrose in solution ranges from about 30% to about 40%.

20. The method of claim 18 wherein said ion exchange column consists of an anion exchange resin.

21. The method of claim 20 wherein said anionic exchange resin is selected from the group of acidic resins consisting of cellulose derivatives, silicates, dextrans, chitin and its derivatives, polyacrylamide gel, styrene and divinyl benzene copolymers and mixtures thereof.

22. The method of claim 18 wherein said ion exchange column consists of a cationic exchange resin.

23. The method of claim 22 wherein said cationic exchange resin is selected from the group of basic resins consisting of cellulose derivatives, chitin and its derivatives, silicates, dextrans, polyacrylamide gel, styrene and divinyl benzene copolymers and mixtures thereof.

24. The method of claim 18 wherein said ion exchange column consists of a mixed bed resin.

25. The method of claim 24 wherein said mixed bed exchange resin is selected from the group consisting of a mixture of basic and acidic resins consisting of cellulose derivatives, polyacrylamide gel, dextrans, chitin and its derivatives, silicates, styrene and divinyl benzene copolymers and mixtures thereof.

26. The method of claims 20, or 24 wherein said polydextrose solution is passed through said ion exchange column at room temperature.

27. The method of claim 16 wherein said polydextrose solution is passed through said ion exchange column more than once.

* * * * *